Figure 1:
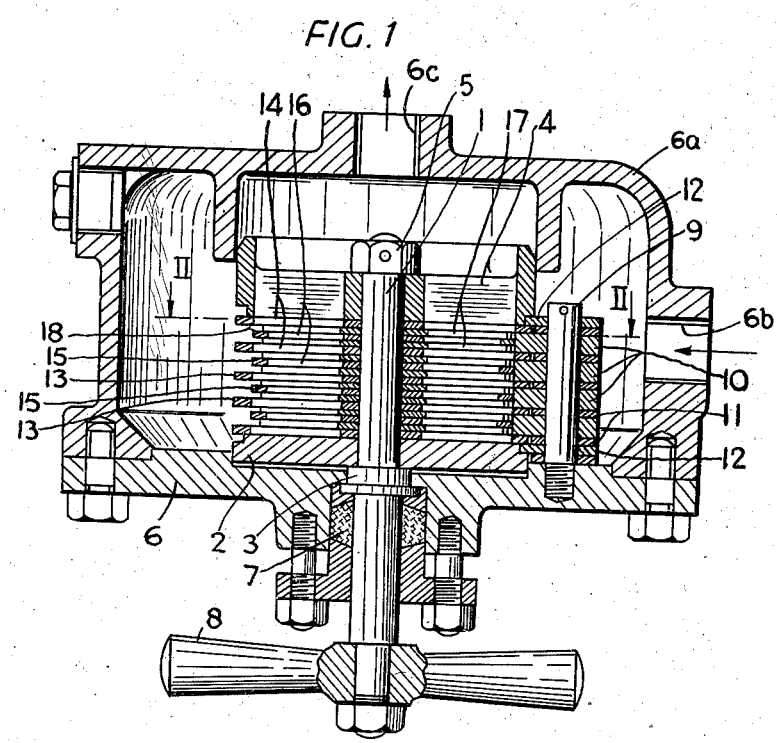

Nov. 9, 1948.   L. W. ENGLISH   2,453,622
STRAINING OR FILTERING APPARATUS FOR LIQUIDS
Filed Dec. 1, 1944   4 Sheets-Sheet 1

Nov. 9, 1948.  L. W. ENGLISH  2,453,622
STRAINING OR FILTERING APPARATUS FOR LIQUIDS
Filed Dec. 1, 1944  4 Sheets-Sheet 2
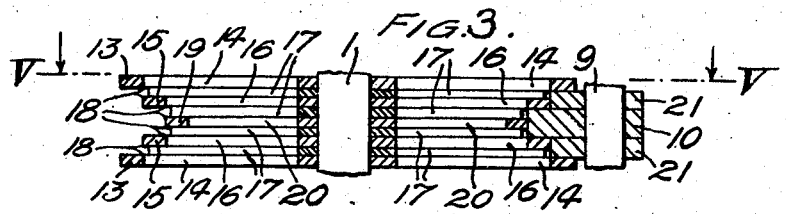
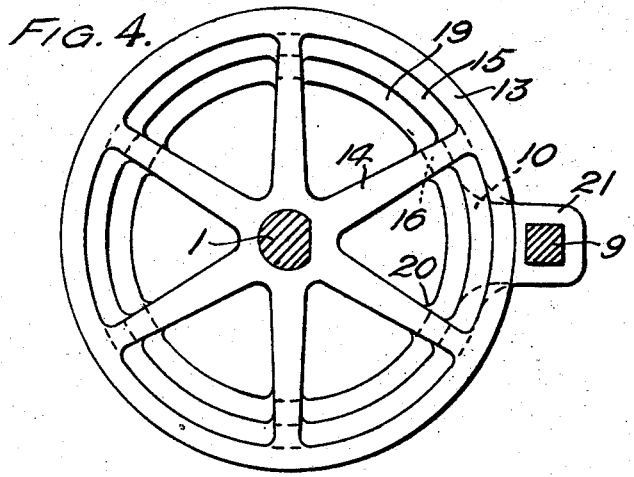
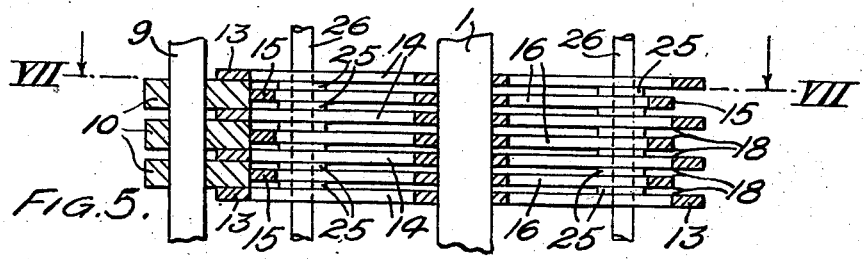
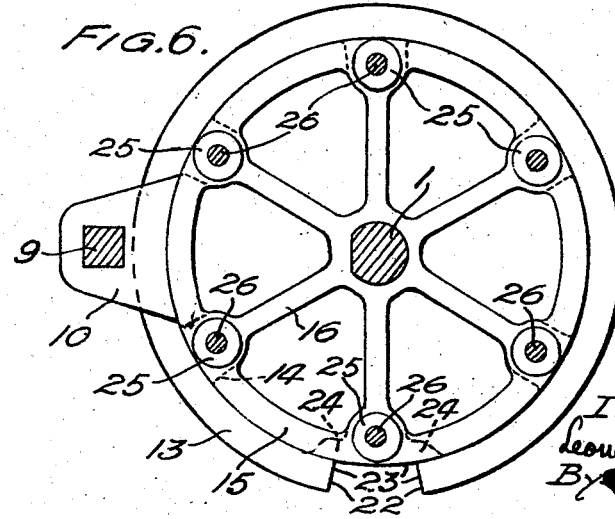
Inventor
Leonard Walter English
By Peck & Peck
Attnys

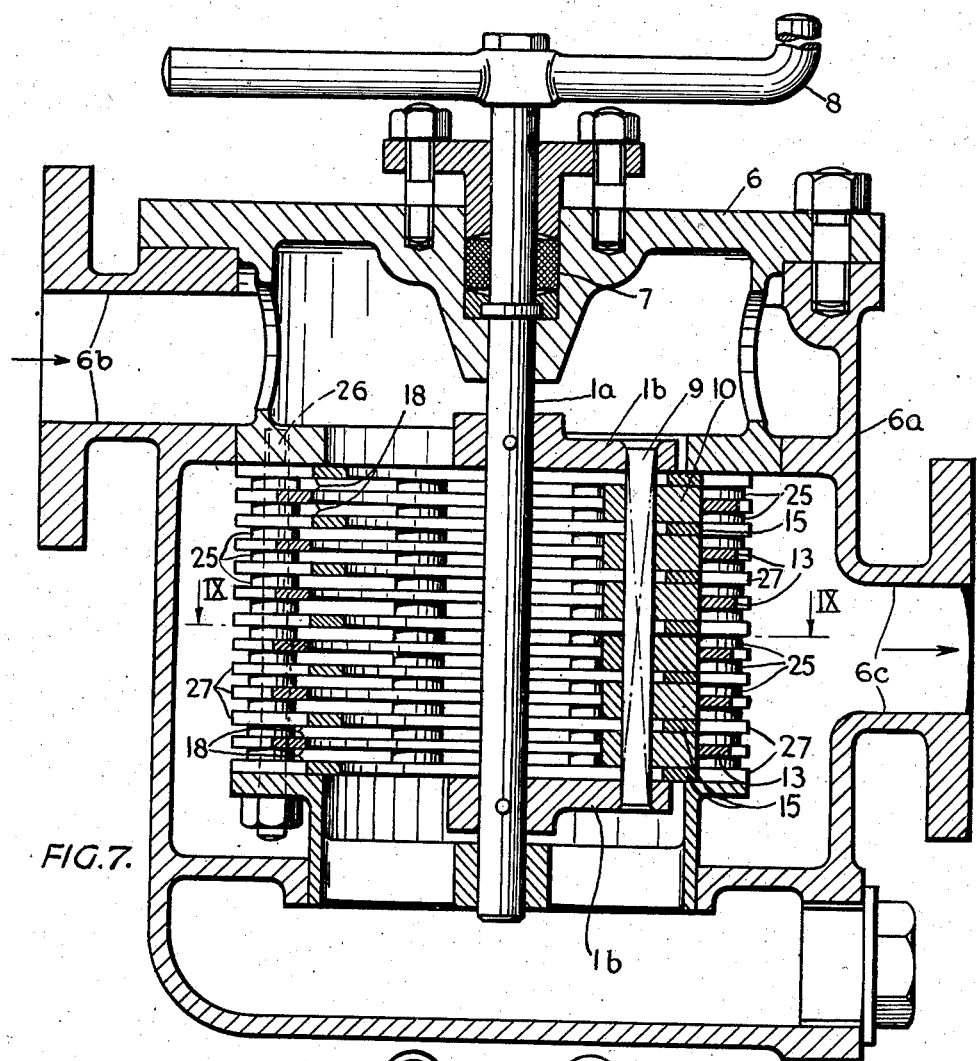
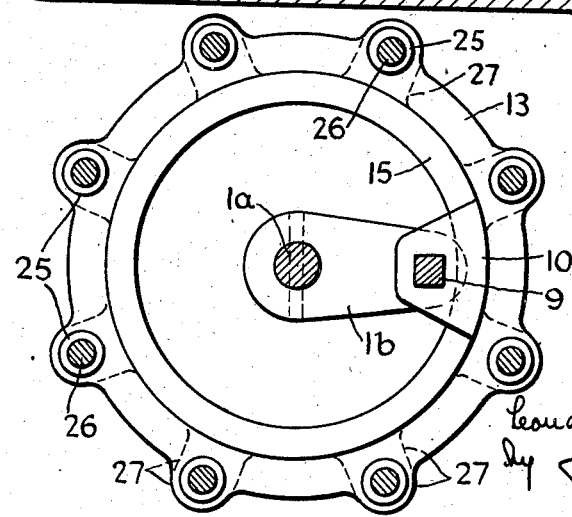

Nov. 9, 1948.　　　　　L. W. ENGLISH　　　　　2,453,622
STRAINING OR FILTERING APPARATUS FOR LIQUIDS
Filed Dec. 1, 1944　　　　　　　　　　　　　　4 Sheets-Sheet 4
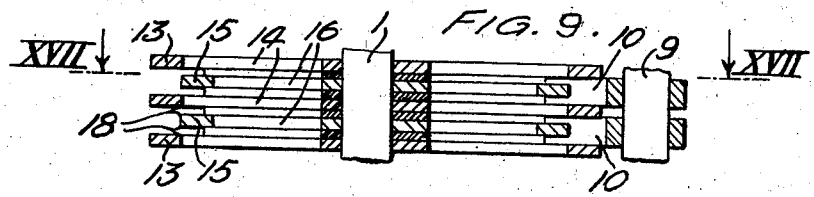
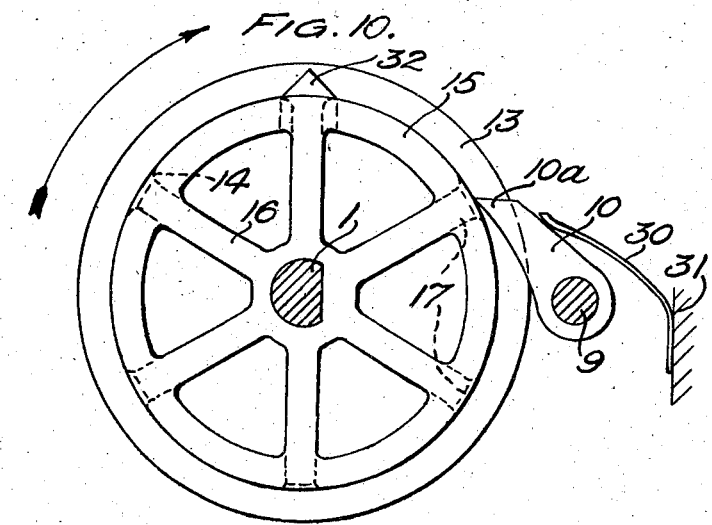
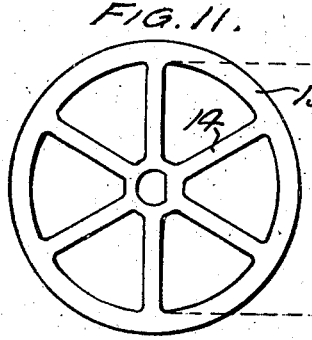 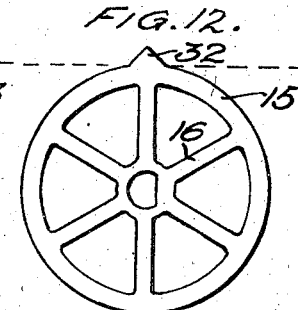 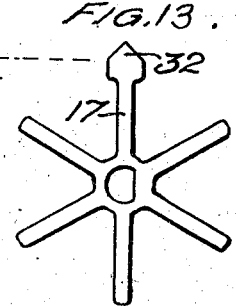
Inventor
Leonard Walter English
By Peck & Peck
Attnys Patented Nov. 9, 1948

2,453,622

UNITED STATES PATENT OFFICE 2,453,622

STRAINING OR FILTERING APPARATUS FOR LIQUIDS

Leonard Walter English, London, England

Application December 1, 1944, Serial No. 566,203
In Great Britain December 3, 1943

5 Claims. (Cl. 210—152)

This invention relates to straining on filtering apparatus for liquids of the kind in which the liquid has a straight-through flow through fine slots formed between a series of parallel filter elements.

Such aparatus as heretofore proposed has usually had the filtering slots defined by the adjacent flat faces of the filter elements which each overlapped the next adjacent element either in the direction of flow of the liquid or in the reverse direction. As a result, since the slots have had an appreciable length in the direction of flow, the pressure drop through the strainer is considerable. Furthermore, in the case of self-cleaning type strainers the scrapers or cleaning blades usually provided have had to project into the slots in order to ensure satisfactory removal of accumulated dirt and foreign matter, and this has restricted the degree of fineness of the filtering slots that may be employed to an extent determined by the minimum permissible thickness and strength of the scrapers.

The main object of the present invention is the provision of improved straining or filtering apparatus of the kind indicated which shall be free from these disadvantages and a further object is the provision of scrapers or cleaning blades of robust construction for use with such improved filtering apparatus.

According to the invention, in a straining or filtering apparatus of the kind in which the liquid has a straight-through flow through fine slots formed between a series of parallel elements, the filtering slots are defined solely by the edges, preferably inner and outer edges, of adjacent filter elements and have no appreciable length in the direction of flow of the liquid.

The filtering elements may be a plurality of rings or discs of two or more diameters spaced apart, when necessary, by washers or other spacer members. For example, rings or discs of larger diameter may alternate with rings or discs of smaller diameter, the diameter of the outer edges of the smaller rings or discs being equal to or slightly greater or less than that of the inner edges of the larger rings or discs. Where these diameters are equal, or the outer diameter of the smaller rings or discs is slightly greater than the inner diameter of the larger rings or discs, some form of spacer member is required but in other cases these spacers may be dispensed with and the rings or discs arranged in contact with each other. When more than two diameters of rings or discs are employed these may be arranged in stepped formation.

Scrapers or cleaning blades for use with the filtering apparatus according to this invention are preferably arranged to contact the outer wall of a smaller diameter ring or disc and to extend across the filtering slots between this and the adjacent rings or discs but in no case to enter such slots. Alternatively, the scrapers may be formed integrally with certain of the rings or discs which may be movable relatively to the remaining rings or discs.

In order that the nature of the invention may be clearly understood, various examples of filtering apparatus constructed in accordance therewith will now be described with reference to the accompanying drawings. Although in this description the filter elements are referred to as "discs" constituting cylindrical piles or packs it is to be understood that rectangular or other shaped piles or packs of such elements may be employed.

Figure 2:
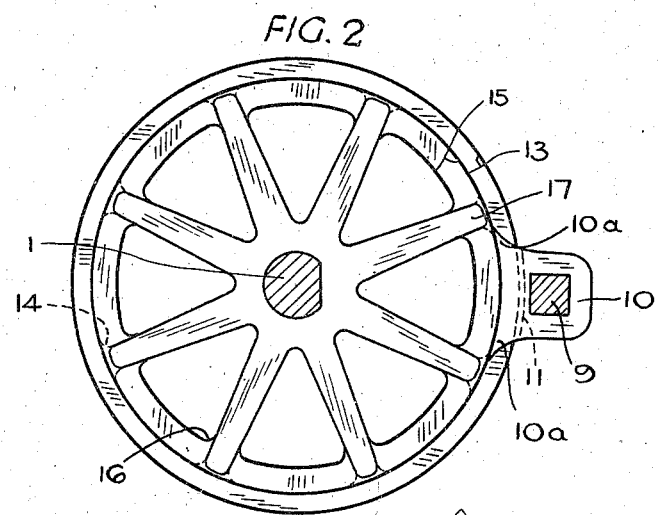

In the drawings:

Fig. 1 is an axial section through one construction of strainer,

Fig. 2 is a section through the assembly of filtering elements and scrapers taken on the line II—II of Fig. 1, Fig. 3 is a fragmentary axial section corresponding to part of Fig. 1 but showing an alternative arrangement of filtering elements and scrapers, Fig. 4 is a section taken on the line V—V of Fig. 2, Fig. 5 is a view similar to Fig. 3, but showing a modified arrangement, Fig. 6 is a section taken on the line VII—VII of Fig. 5, Fig. 7 is a view similar to Fig. 1 of a strainer embodying a filtering elements-and-scraper assembly in which the scrapers are internally arranged, Fig. 8 is a section taken on the line IX—IX of Fig. 7, Fig. 9 is a view similar to Fig. 3 illustrating a further construction according to the invention, Fig. 10 is a section taken on the line XVII—XVII of Fig. 9, Fig. 11 is a plan view of a larger diameter filtering element employed in this construction, Fig. 12 is a plan view of the corresponding smaller diameter filtering element, and Fig. 13 is a plan view of the corresponding spacer.

In all these figures like parts are indicated by the same reference numerals and only so much of the various forms is illustrated as is essential to a full understanding of the invention. Fig. 1 is an example only of one method of building up a complete strainer or filter embodying the characteristic features of this invention and it is thought that those skilled in the art will readily be able to modify such an arrangement to suit the various embodiments herein described without further illustration of specific means which in themselves form no part of the invention.

As shown in Fig. 1, a substantially cylindrical straining wall is composed of the rim portions of alternate wheel-like discs of larger and smaller diameter spaced apart by spider-like spacers and all non-rotatably secured on a suitably flatted central spindle 1 through the intermediary of an end-plate 2 which abuts against an enlarged portion 3 of the spindle and a wheel-shaped end-member 4 engaged by a nut 5 screwed on the inner end of the spindle 1. The spindle 1 is rotatably mounted in a plate 6 through which it passes by way of a packed gland 7, the outer end of the spindle being furnished with a handle 8. By means of the plate 6, the strainer is mounted, in this example, in known manner in a suitable vessel 6a by way of an inlet 6b in which the liquid to be strained has access to the exterior of the straining wall where it is strained in entering the chamber enclosed by the said wall through the annular spaces between the discs. The filtered or strained liquid passes out of the vessel 6a through the outlet 6c. Mounted in the plate 6, to one side of the straining wall and outside the same in this example, is a square post 9 supporting a series of scrapers or cleaning blades 10 alternating with spacing washers 11 and clamped between end-pieces 12 engaged by annular shoulders on the parts 2 and 4. When necessary, cleaning of the strainer is effected in known manner by turning the straining wall, by means of the handle 8, in relation to the stationary cleaning blades 15. A further set of the latter may be arranged on a duplicate post located diametrically opposite to the post 9, the blades 10 then being alternated on the posts so that no two blades which project into adjacent spaces between the elements constituting the straining wall are mounted upon the same post. This cancels out any heavy side thrusts which may tend to be produced, as is known from British Specification No. 527,639.

The present invention is concerned with the constitution and arrangement of the straining wall and the scrapers 10.

In the example of Figs. 1 and 2, the straining wall is composed of rim portions 13 of larger diameter wheel-like discs 14 alternated with rim portions 15 of smaller diameter wheel-like discs 16 spaced apart by spider-like spacers 17. The rim portions 13 of the larger discs 14 have an internal diameter equal to the external diameter of the rim portions 15 of the smaller dicsc 16 so that the filtering slots 18 (Fig. 1) are defined by the inner edges of the larger discs and the outer edges of the adjacent smaller discs. The scrapers 10 are in the form of blades extending between the adjacent larger discs 14 to bear on the outer edges of the smaller discs 16 comprised between them and are mounted, as described, on the post 9. As has been mentioned, relative motion may be produced between the straining wall and the scrapers, when desired, in order to effect cleaning of the filtering slots 18. The blades 10 are formed with plough-like tips 10a (Fig. 2) in known manner and are preferably of a thickness equal to the distance between the opposed faces of the adjacent larger discs 14, i. e. equal to the axial thickness of the smaller disc 16 plus twice the axial width of a filtering slot 18, as shown in Fig. 1.

Another example illustrated in Figs. 3 and 4 differs from that of Figs. 1 and 2 in that discs of three or more different diameters are provided, three being chosen and the two larger discs corresponding to the discs of Figs. 1 and 2. The internal diameter of the rim portion 13 of the largest disc 14 is equal to the external diameter of the rim portion 15 of the intermediate disc 16 and the internal diameter of the latter rim portion 15 is equal to the external diameter of the rim portion 19 of the smallest disc 20. Such discs are arranged in stepped formation with the smallest disc 20 between two intermediate discs 16 and this group between two of the largest size of disc 14, the spacers 17 being suitably stepped in size to correspond. In this case the scrapers may be arranged closely adjacent to each other, a central blade 10 extending to the smallest disc 20 and contacting the opposed faces of the intermediate discs 16 and two thinner blades 21 each extending to an intermediate disc 16 and contacting the adjacent face of the respective largest disc 14. The filtering slots 18 are defined by the edges of the adjacent discs as before.

In yet another form, illustrated in Figs. 5 and 6, the straining wall is constructed substantially as described in the first example but the rim portions 13 of the larger diameter discs 14 are each cut away over a small arc of their outer circumference as shown at 22 in Fig. 6, at a predetermined location which is illustrated as being opposite the end of a spoke-like portion of the disc, to provide a passage 23 through which displaced dirt and the like may be discharged during the cleaning or scraping operation. The rim portions 13 of the discs 14 are made of greater radial depth at this location as indicated at 24 in Fig. 6 so that there is no gap in the filtering slots 18. In the construction shown, moreover, the spacers are no longer spider-like but comprise annular members 25 threaded on bolts 26 that pass through suitably widened parts of the spoke-like portions of the discs 14 and 16 to clamp them together.

The examples described above have external scrapers but internal scrapers may be employed when the direction of flow of the liquid is from the interior of the cylindrical straining wall outwards. In one suitable arrangement as illustrated in Figs. 7 and 8, the scraper blades 10 each extend to the inner edge of a larger diameter disc and wipe the opposed faces of the adjacent smaller discs. A suitable modification of the filter elements to permit the use of this internal scraper device is to construct them as larger rings 13 and smaller rings 15 each having external lugs or ears 27 by which they are mounted on bolts or spindles 26, with the interposition of spacing washers 25 as may be necessary. In the example chosen the outer diameter of the rings 15 is equal to the inner diameter of the rings 13, the filtering slots 18 being defined by the corresponding edges as before. The post 9 on which the scraper blades 10 are mounted is carried between radial arms 1b secured on a central spindle 1a on the outer end of which the handle 8 is fixed. The inlet to the vessel 6a is shown at 6b and the outlet therefrom is at 6c.

By means of the arrangements according to this invention the finest degree of straining required may be provided without limitations being imposed due to the strength and thickness of the cleaning blades and the loss of pressure due to the passage of the liquid through the straining wall is reduced to a minimum.

Movement may be imparted to the discs and/or to the scrapers or the like by hand or mechanical means and the scrapers may have any suitable shape. In addition, the scrapers which normally run in contact with the discs may be mounted on means which permit of their being lifted from the discs when desired either to lighten the load on the scrapers or to throw off any collected dirt or foreign matter.

What I claim is:

1. In a strainer for liquids comprising a straining wall consisting of a plurality of similarly shaped and similarly disposed plane filter elements mounted side by side in parallel relation on a carrier and each having a hole therethrough, separating means between adjacent elements to space them apart and form endless peripheral slots through which the liquid flows between the exterior and interior of the straining wall in a direction substantially parallel with the plane faces of the elements of the latter, scraper means separate from the elements and permanently in engagement with the straining wall, and means for producing relative movement between the straining wall and the scraper means, the construction in which any pair of adjacent filter elements are of different sizes and the leading edge of the one element of the pair, considered in the direction of flow of the liquid through the straining wall, is of the same dimensions as the trailing edge of the other element of the said pair, considered in the same direction, so that the peripheral slot between the elements of the said pair is defined solely by the said edges which are located in a common plane normal to the plane faces of the elements, and in which the scraper means comprises a plurality of elements each contacting at least one of the slot-defining edges of a pair of adjacent filter elements and extending across but not into the slot between the said adjacent elements.

2. A straining or filtering wall for apparatus for straining or filtering liquids, composed of a number of sections each comprising a plurality of parallel annular filter elements disposed coaxially in fixed relationship to each other with adjacent elements of different sizes, means spacing the elements apart axially to provide filtering slots between adjacent elements through which liquid will flow radially of the elements, each annular filter element having a leading and a trailing edge, considered in the said direction of flow of the liquid, and the trailing edge of one of a pair of adjacent elements being of the same diameter as the leading edge of the other of the said pair of elements so that the filtering slot between the elements of the pair is defined solely by the said edges which are located in a common cylindrical plane disposed coaxially with the elements and transversely to the said direction of flow, scraper means for each section contacting at least one of the slot-defining edges of a pair of adjacent filter elements on the side to which the liquid is supplied and extending across but not into the slot between the said adjacent elements and means for producing relative motion between the wall and the scraper means for cleaning the filtering slots.

3. In a straining or filtering apparatus, the combination with a straining wall and scraper means as claimed in claim 2 of means formed on a filter element of the said section for lifting the scraper out of contact temporarily as the said motion continues.

4. In a straining or filtering apparatus having a straining wall and scraper means as claimed in claim 2, shaping the filter elements which are not contacted by the scraper means to provide a passage through which displaced dirt may be discharged during the cleaning operation.

5. In a straining or filtering apparatus having a straining wall and scraper means as claimed in claim 2, providing a scraper blade for each wall-section bearing on the leading edge of one filter element of a pair and against an adjacent face of the other filter element of the said pair.

LEONARD WALTER ENGLISH.

REFERENCES CITED

The following references are of record in the file of this patent:

UNITED STATES PATENTS

| Number | Name | Date |
|---|---|---|
| 1,581,998 | Fulcher | Apr. 20, 1926 |
| 1,657,346 | Cuno | Jan. 24, 1928 |
| 1,673,743 | Fulcher et al. | June 12, 1928 |
| 1,719,346 | Thompson | July 2, 1929 |
| 1,754,728 | Thompson | Apr. 15, 1930 |
| 1,757,153 | Thompson | May 6, 1930 |
| 1,852,873 | Berger | Apr. 5, 1932 |
| 1,877,449 | Fulcher | Sept. 13, 1932 |
| 1,877,450 | Fulcher | Sept. 13, 1932 |
| 1,877,451 | Fulcher | Sept. 13, 1932 |
| 1,926,557 | Perkins | Sept. 12, 1933 |
| 1,938,934 | Scott | Dec. 12, 1933 |
| 1,976,547 | Dumas | Oct. 9, 1934 |
| 2,029,611 | Chewning | Feb. 4, 1936 |
| 2,227,344 | Hartman | Dec. 31, 1940 |
| 2,289,539 | Cuno | July 14, 1942 |
| 2,298,865 | Beldam | Oct. 13, 1942 |
| 2,365,525 | Cox | Dec. 19, 1944 |